(12) United States Patent
Shimamura

(10) Patent No.: US 9,632,766 B2
(45) Date of Patent: Apr. 25, 2017

(54) INFORMATION PROCESSING DEVICE AND DEPLOYMENT METHOD

(71) Applicant: NEC Corporation, Minato-ku, Tokyo (JP)

(72) Inventor: Hisashi Shimamura, Tokyo (JP)

(73) Assignee: NEC CORPORATION, Tokyo (JP)

(*) Notice: Subject to any disclaimer, the term of this patent is extended or adjusted under 35 U.S.C. 154(b) by 13 days.

(21) Appl. No.: 14/779,726

(22) PCT Filed: Mar. 25, 2014

(86) PCT No.: PCT/JP2014/001702
§ 371 (c)(1),
(2) Date: Sep. 24, 2015

(87) PCT Pub. No.: WO2014/167790
PCT Pub. Date: Oct. 16, 2014

(65) Prior Publication Data
US 2016/0062755 A1 Mar. 3, 2016

(30) Foreign Application Priority Data
Apr. 11, 2013 (JP) ................................. 2013-083085

(51) Int. Cl.
*G06F 9/445* (2006.01)
(52) U.S. Cl.
CPC ....................................... *G06F 8/61* (2013.01)
(58) Field of Classification Search
None
See application file for complete search history.

(56) References Cited

U.S. PATENT DOCUMENTS 6,704,778 B1 * 3/2004 Horman .............. H04L 41/0803
709/220
2012/0198438 A1 8/2012 Auer

FOREIGN PATENT DOCUMENTS

JP        4852734 B1       1/2012
JP        2012-048410 A    3/2012

OTHER PUBLICATIONS

International Search Report for PCT Application No. PCT/JP2014/001702, mailed on Jun. 24, 2014.
(Continued)

*Primary Examiner* — Chuck Kendall

(57) ABSTRACT

An objective of the present invention is to carry out a decentralized deployment of components even for construction of a decentralized system that has dependencies among the components in different processing devices.
A script generating unit (130) of a deployment device (100) generates a script for each of a plurality of processing devices (200) on the basis of logical configuration information (111) and physical configuration information (121). The logical configuration information (111) indicates dependencies among software components composing a system. The physical configuration information (121) indicates a processing device (200) to which each of the software components composing the system is deployed. In the script (131), a process to deploy each software component deployed to the processing device (200) and a process to deploy a synchronization module are described together with an execution sequence. The synchronization module synchronizes processing of the script (131) with a synchronization module deployed to another processing device (200).

11 Claims, 13 Drawing Sheets

(56) References Cited

OTHER PUBLICATIONS

English translation of Written opinion for PCT Application No. PCT/JP2014/001702.
"WebSAM Deployment Manager", NEC Corporation, URL: http://www.nec.co.jp/middle/WebSAM/products/deploy_win/. [retrieved on Mar. 22, 2013].
"Puppet Labs: IT Automation Software for System Administrators", Puppet Labs, URL: http://puppetlabs.com/. [retrieved on Mar. 22, 2013].

* cited by examiner

INFORMATION PROCESSING DEVICE AND DEPLOYMENT METHOD

This application is a National Stage Entry of PCT/JP2014/001702 filed on Mar. 25, 2014, which claims priority from Japanese Patent Application 2013-083085 filed on Apr. 11, 2013, the contents of all of which are incorporated herein by reference, in their entirety.

TECHNICAL FIELD

The present invention relates to an information processing device, a deployment method, and a program that carry out deployment of software components. More particularly, the present invention relates to an information processing device, a deployment method, and a program that deploy a plurality of software components composing a system to a plurality of processing device in a decentralized manner.

BACKGROUND ART

A present-day IT (Information Technology) system is configured with a plurality of software components, namely middleware, such as a database or an application server, a related program library, and an application program. Since these components operate by communicating with one another and the components have dependencies thereamong, when a system is constructed on processing devices, deployment sequences among the components, which are defined on the basis of the dependencies, are required to be followed.

For example, in PTL1, a software installation system is disclosed in which, when a plurality of pieces of software are installed at the same time, the plurality of pieces of software are sorted in an appropriate installation sequence in accordance with compatibility among the pieces of software.

In many cases, components composing a system are deployed to a plurality of processing devices in a decentralized manner for the purpose of load balancing and availability improvement. In the construction of such a decentralized system, when dependencies among components in different processing devices exist, it is required to control deployment sequences among the components in the different processing devices.

Constraints on deployment sequences of components in the construction of a decentralized system are very complicated in general. Therefore, for operational management middleware as disclosed in NPL1, a central management type deployment server is used. In this case, the deployment server controls deployment sequences among respective components composing a system. However, when the central management type deployment server is used, control communications for the deployment of the respective components concentrate on the deployment server, causing a bottleneck of performance or availability. The above situation becomes a problem, in particular, in the construction of a large-scale decentralized system in which processing devices number in hundreds, which is used in big data analysis of recent years or the like.

On the other hand, recent years, decentralization in the deployment of components by use of deployment scripts, as disclosed in NPL2, has been applied in the construction of decentralized systems. In this case, each processing device, in accordance with a deployment script that is generated with respect to each processing device, acquires components to be deployed to the processing device from a repository and deploys the acquired components. In this method, since control communications do not concentrate on a particular server and the respective processing devices carry out the deployment of components individually, it is easy to construct a large scale system. However, although such a deployment script is capable of controlling deployment sequences among components that are deployed to the same processing device, the deployment script is incapable of controlling deployment sequences among components that are deployed to different processing devices. Therefore, the decentralized deployment disclosed in NPL2 cannot be applied to the construction of a decentralized system that has dependencies among components in different processing devices.

CITATION LIST

Patent Literature

[PTL1] Japanese Patent Application Laid-Open Publication No. 2012-048410

Non Patent Literature

[NPL1] "WebSAM Deployment Manager", NEC Corporation, [online], [retrieved on Mar. 22, 2013], the Internet <URL: http://www.nec.co.jp/middle/WebSAM/products/deploy_win/>

[NPL2] "Puppet Labs: IT Automation Software for System Administrators", Puppet Labs, [online], [retrieved on Mar. 22, 2013], the Internet <URL: http://puppetlabs.com/>

SUMMARY OF INVENTION

Technical Problem

As described above, the decentralized deployment disclosed in NPL2 cannot be applied to the construction of a decentralized system that has dependencies among components in different processing devices.

An object of the present invention is to solve the above-described problem and provide an information processing device and a deployment method that make it possible to carry out decentralized deployment of components in the construction of a decentralized system that has dependencies among components in different processing devices.

Solution to Problem

An information processing device according to an exemplary aspect of the invention includes: a logical configuration information storing means for storing logical configuration information that indicates dependencies among a plurality of software components of a system; a physical configuration information storing means for storing physical configuration information that indicates a processing device among a plurality of processing devices, to which each of the plurality of software components of the system is to be deployed; and a script generating means for generating a script for each of the plurality of processing devices on the basis of the logical configuration information and the physical configuration information, the script being to be executed on the processing device, the script indicating a process for deploying each software component to be deployed to the processing device and a process for deploying a synchronization module to synchronize processing of the script with a synchronization module deployed to another processing device together with an execution sequence.

A deployment method according to an exemplary aspect of the invention includes: storing logical configuration information that indicates dependencies among a plurality of software components of a system; storing physical configuration information that indicates a processing device among a plurality of processing devices, to which each of the plurality of software components of the system is to be deployed; and generating a script for each of the plurality of processing devices on the basis of the logical configuration information and the physical configuration information, the script being to be executed on the processing device, the script indicating a process for deploying each software component to be deployed to the processing device and a process for deploying a synchronization module to synchronize processing of the script with a synchronization module deployed to another processing device together with an execution sequence.

A first computer readable storage medium according to an exemplary aspect of the invention records thereon a program, causing a computer to perform a method including: storing logical configuration information that indicates dependencies among a plurality of software components of a system; storing physical configuration information that indicates a processing device among a plurality of processing devices, to which each of the plurality of software components of the system is to be deployed; and generating a script for each of the plurality of processing devices on the basis of the logical configuration information and the physical configuration information, the script being to be executed on the processing device, the script indicating a process for deploying each software component to be deployed to the processing device and a process for deploying a synchronization module to synchronize processing of the script with a synchronization module deployed to another processing device together with an execution sequence.

A second computer readable storage medium according to an exemplary aspect of the invention records thereon a program, causing a computer to execute: a process for deploying each software component to be deployed to the computer, among a plurality of software components of a system; and a process for deploying a synchronization module to synchronize processing of the program with a synchronization module deployed to another processing device, wherein the process for deploying each software component and the process for deploying the synchronization module are executed according to an execution sequence decided on the basis of dependencies among the plurality of software components.

Advantageous Effects of Invention

An advantageous effect of the present invention is that, when the deployment of a decentralized system is carried out in respective processing devices in a decentralized manner, it is possible to appropriately control deployment sequences of components among the processing devices.

DESCRIPTION OF EMBODIMENTS

First Exemplary Embodiment

A first exemplary embodiment of the present invention will be described.

First, a configuration of the first exemplary embodiment of the present invention will be described.

Figure 2:
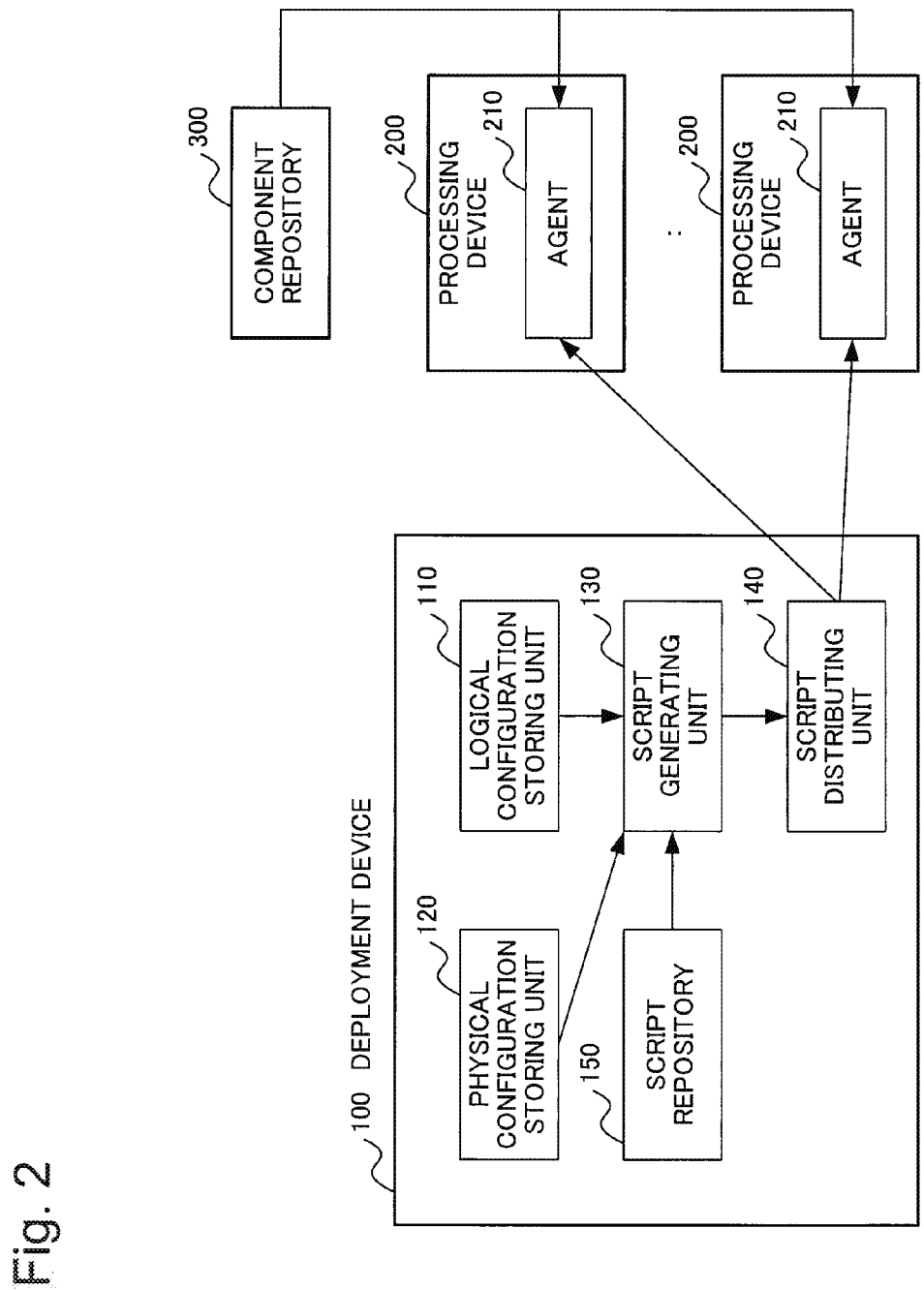
FIG. 2 is a block diagram illustrating a configuration of an information processing system in the first exemplary embodiment of the present invention.

FIG. 2 is a block diagram illustrating a configuration of an information processing system (hereinafter, also referred to as a deployment system) in the first exemplary embodiment of the present invention.

With reference to FIG. 2, the deployment system includes a deployment device 100, a plurality of processing devices 200, and a component repository 300. The deployment device 100 is an exemplary embodiment of an information processing device of the present invention.

The deployment device 100, by deploying each of a plurality of software components (hereinafter, simply referred to as components) that compose IT systems to any one of the plurality of processing devices 200, constructs a system. The above components are program modules, such as an operating system (OS), middleware (MW), and an application (AP).

Each processing device 200 is a computer that executes processing of respective components that compose a system. Each processing device 200 includes an agent 210. The agent 210 acquires components to be deployed from the component repository 300 in accordance with a script 131, which is received from the deployment device 100, and carries out deployment (installation and activation of an initialization process) of the components. The processing devices 200 may be virtual machines (VM) that are constructed on a computer(s).

The component repository 300 stores components to compose systems.

The deployment device 100 includes a logical configuration storing unit 110, a physical configuration storing unit 120, a script generating unit 130, a script distributing unit 140, and a script repository 150.

The logical configuration storing unit 110 stores logical configuration information 111. The logical configuration information 111 indicates dependencies among components that compose a system. The logical configuration information 111 is set in advance by an administrator or the like. A not-illustrated logical configuration acquiring unit may acquire the logical configuration information 111 from the outside of the deployment device 100 and store the acquired logical configuration information 111 in the logical configuration storing unit 110.

Figure 3:
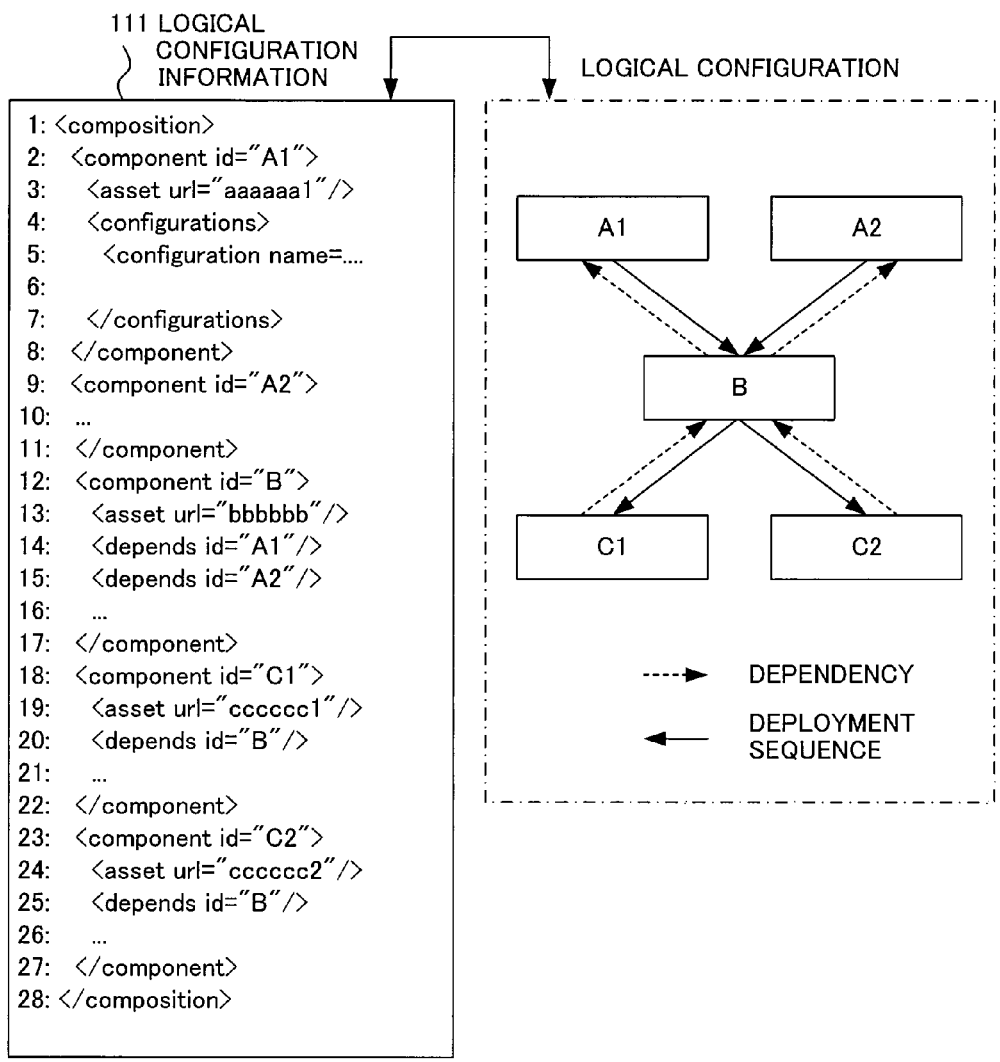
FIG. 3 is a diagram illustrating an example of logical configuration information 111 in the first exemplary embodiment of the present invention.

FIG. 3 is a diagram illustrating an example of the logical configuration information 111 in the first exemplary embodiment of the present invention. In the example in FIG. 3, the logical configuration information 111 is scripted in an XML (Extensible Markup Language) format. In the description hereinafter, line numbers that are added to XML-format descriptions are added for the purpose of illustration and differ from the actual numbers of lines. The logical configuration information 111 in FIG. 3 corresponds to a logical configuration illustrated on the right-hand side therein.

In the logical configuration in FIG. 3, arrows that are illustrated with dotted lines represent dependencies. Each of the arrows illustrated with dotted lines indicates that the source component thereof is dependent on the destination component thereof. Arrows that are illustrated with solid lines represent sequences of deployment. Each of the arrows illustrated with solid lines indicates that the source component thereof is required to be deployed earlier than the destination component thereof.

In the example in FIG. 3, a system is configured from components "A1", "A2", "B", "C1", and "C2". Since the components "C1" and "C2" are dependent on the component "B", the component "B" is required to be deployed earlier than the components "C1" and "C2". Since the component "B" is dependent on the components "A1" and "A2", the components "A1" and "A2" are required to be deployed earlier than the component "B". After the deployment of the component "B", either the component "C1" or "C2" may be deployed earlier than the other or both the components "C1" and "C2" may be deployed at the same time.

The logical configuration information 111 includes, with respect to each component composing the system, an identifier of a physical entity (a file or the like) of the component (for example, line 13 in the logical configuration information 111 in FIG. 3) and an identifier(s) of another/other component(s) on which the component is dependent (lines 14 and 15). On the basis of the identifier of the physical entity of each component, a script element to deploy the component and the component are acquired from the script repository 150 and the component repository 300, respectively.

The physical configuration storing unit 120 stores physical configuration information 121. The physical configuration information 121 indicates processing devices 200 to which the respective components composing the system are to be deployed. The physical configuration information 121 is set in advance by the administrator or the like. A not-illustrated physical configuration acquiring unit may acquire the physical configuration information 121 from the outside of the deployment device 100 and store the acquired physical configuration information 121 in the physical configuration storing unit 120.

Figure 4:
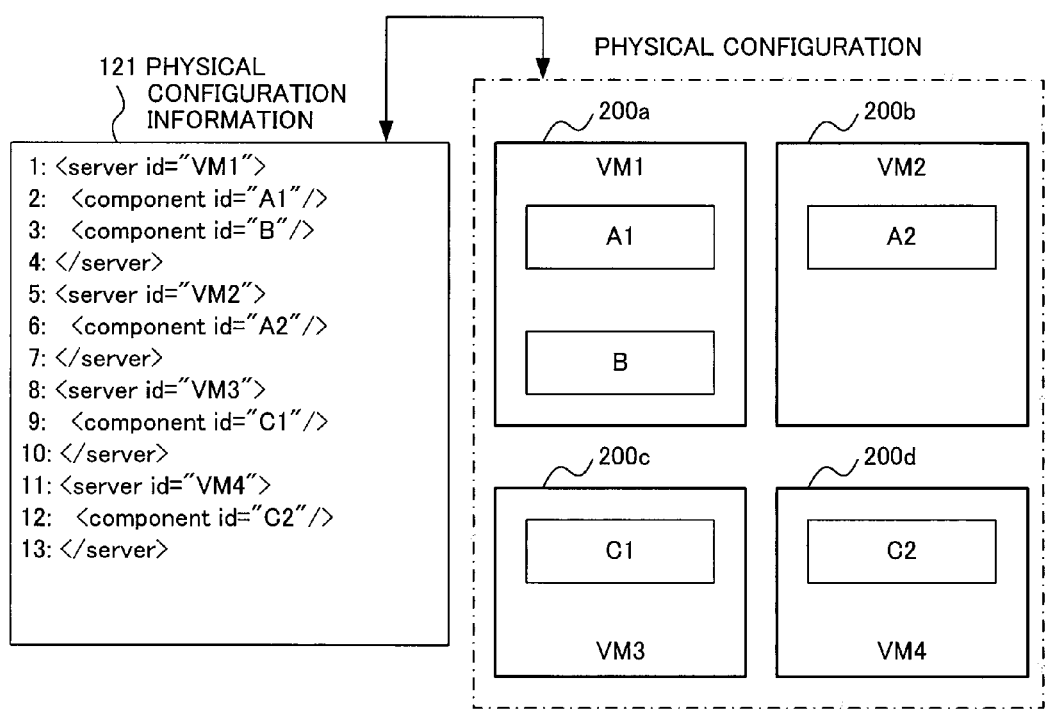
FIG. 4 is a diagram illustrating an example of physical configuration information 121 in the first exemplary embodiment of the present invention.

FIG. 4 is a diagram illustrating an example of the physical configuration information 121 in the first exemplary embodiment of the present invention. In the example in FIG. 4, the physical configuration information 121 is scripted in an XML format. The physical configuration information 121 in FIG. 4 corresponds to a physical configuration illustrated on the right-hand side therein.

In the physical configuration in FIG. 4, the components "A1", "A2", "B", "C1", and "C2" that compose the system are deployed to virtual machines "VM1" to "VM4" in a decentralized manner.

The physical configuration information 121 includes, with respect to each processing device 200, components to be deployed to the processing device 200 (for example, lines 1 to 4, lines 5 to 7, lines 8 to 10, and lines 11 to 13 in the physical configuration information 121 in FIG. 4).

The script generating unit 130 generates scripts 131 each of which is a program in which a process by which each processing device 200 deploys components to be deployed to the processing device 200 is described.

In the generation, the script generating unit 130 first generates scripts 131 in each of which, in a similar manner to a script as disclosed in NPL2, deployment sequences among components in the same processing device 200 are taken into consideration. Further, the script generating unit 130 inserts script elements of synchronization modules in the generated scripts 131. Each synchronization module is a program module to synchronize processing of the script 131 with a synchronization module deployed to another processing device 200.

Figure 5:
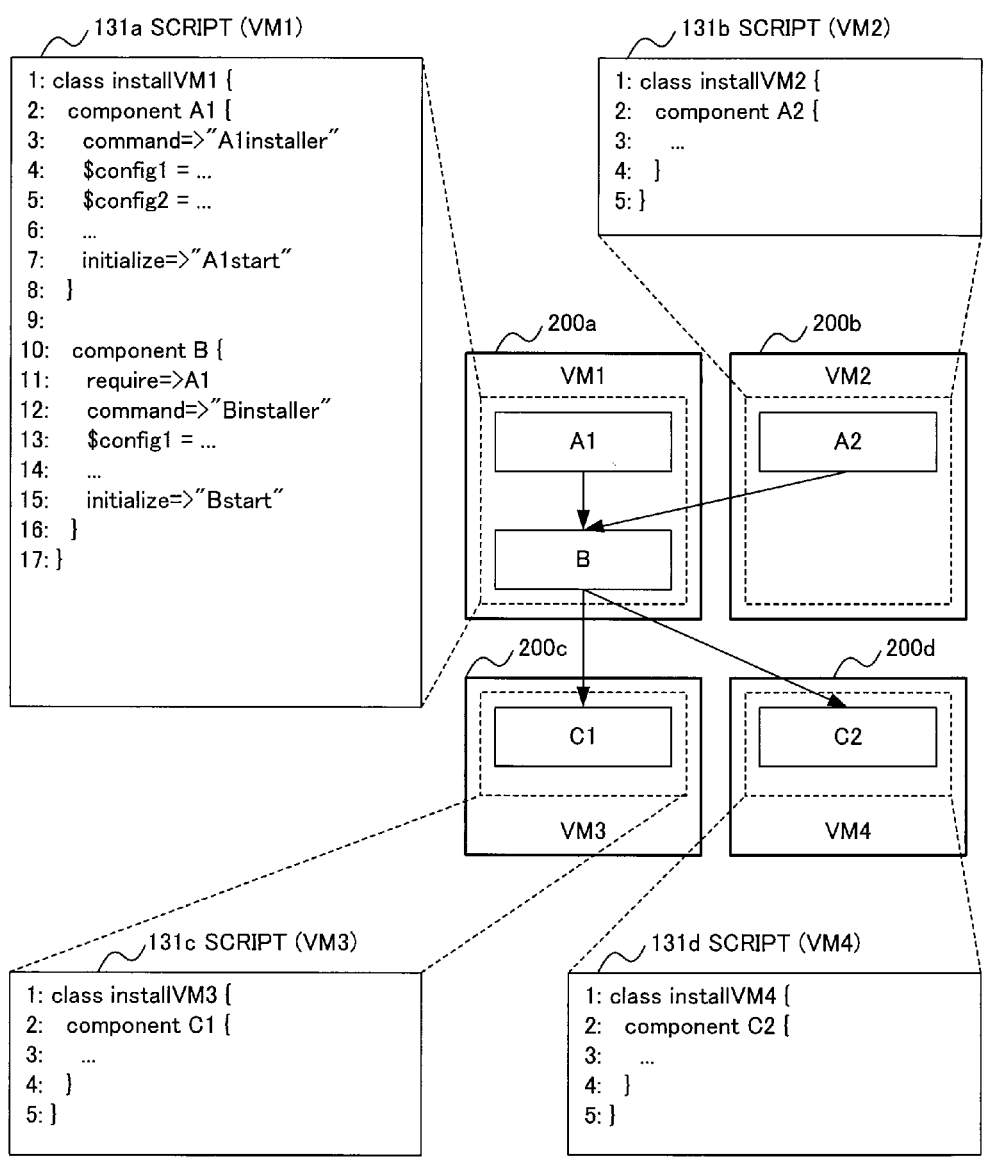
FIG. 5 is a diagram illustrating an example of scripts 131 (before insertion of synchronization modules) in the first exemplary embodiment of the present invention.

FIG. 5 is a diagram illustrating an example of the scripts 131 (131*a* to 131*d*) (before the insertion of synchronization modules) in the first exemplary embodiment of the present invention. In the example in FIG. 5, the scripts 131 are scripted in an XML format.

In the scripts 131, script elements of the respective components to be deployed to the processing devices 200 are arranged.

For example, in the script 131*a* for the virtual machine "VM1" in FIG. 5, a script element (lines 2 to 8) to deploy the component "A1" and a script element (lines 10 to 16) to deploy the component "B" are arranged.

Each script element includes a command to install a component (for example, line 3 in the script 131*a* in FIG. 5), a parameter(s) in initializing the component (lines 4 and 5), and a command to activate an initialization process of the component (line 7). Carrying out the installation and initialization processes of the components in accordance with these descriptions causes the components to be deployed.

When a constraint(s) on a deployment sequence(s) among components exist(s), to the script element(s) of a component(s) to be deployed later, a list(s) of another/other component(s) to be deployed earlier (a requisite component(s)) is/are added (for example, line 11 in the script 131*a* in FIG. 5).

For example, in the script 131*a* in FIG. 5, the component "A1" is specified as a requisite component of the component "B".

Components that have no constraint on the deployment sequences thereamong may be deployed in parallel.

Figure 6:
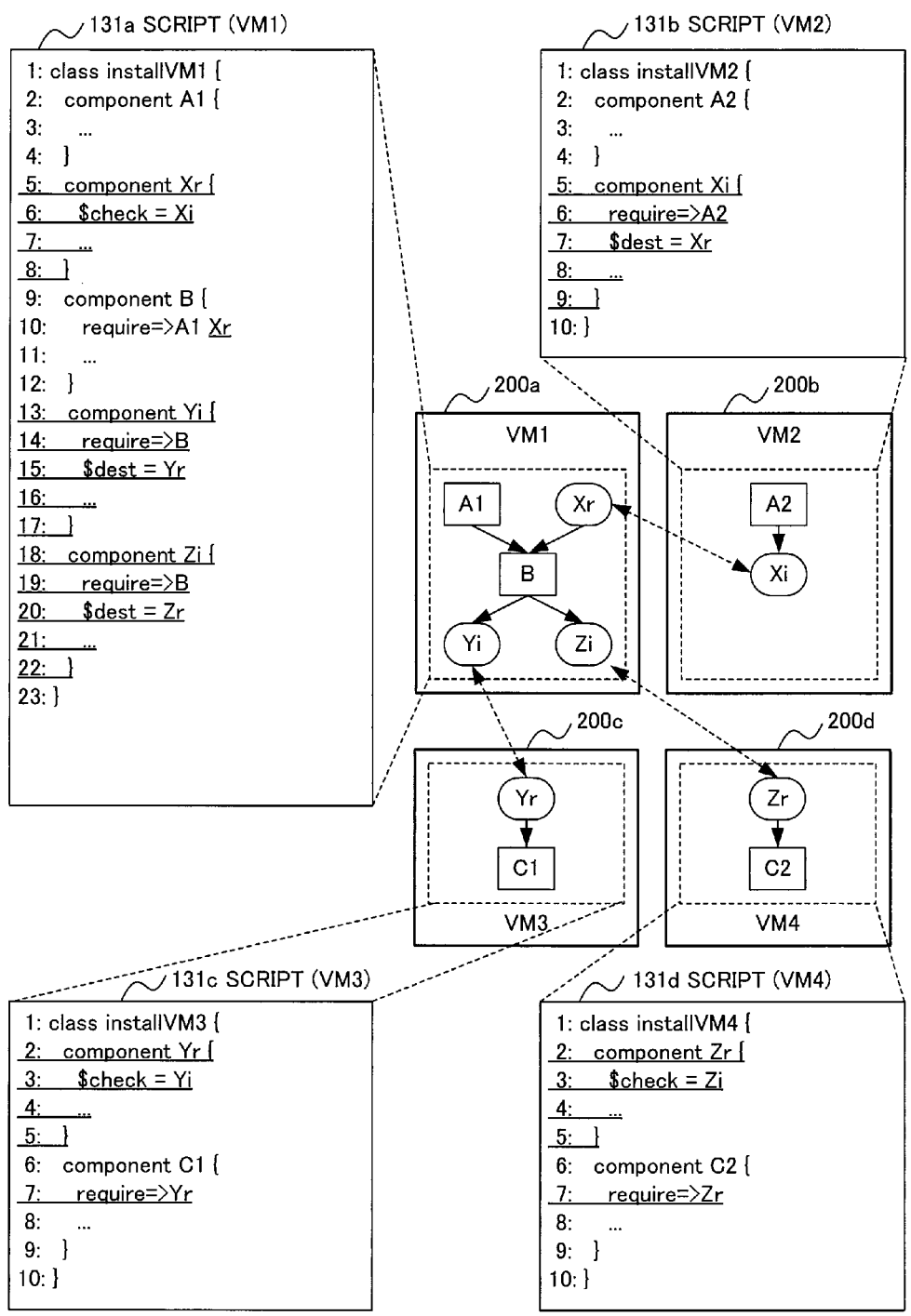
FIG. 6 is a diagram illustrating an example of the scripts 131 (after the insertion of the synchronization modules) in the first exemplary embodiment of the present invention.

FIG. 6 is a diagram illustrating an example of the scripts 131 (131a to 131d) (after the insertion of synchronization modules) in the first exemplary embodiment of the present invention.

In the first exemplary embodiment of the present invention, an initiator(s) 501 and a responder(s) 511 are used as synchronization modules. The initiator(s) 501 is/are a component(s) that transmit(s), to a specified responder(s) 511, a message(s) to synchronize processing of the scripts 131 among the processing devices 200. The responder(s) 511 is/are a component(s) that wait(s) to receive a message(s) from a specified initiator(s) 501.

For example, the script 131a for the virtual machine "VM1" in FIG. 6 has a script element to deploy a responder 511 "Xr" (lines 5 to 8) inserted in the script 131a in FIG. 5. Further, a script element to deploy an initiator 501 "Yi" (lines 13 to 17) and a script element to deploy an initiator 501 "Zi" (lines 18 to 22) are inserted.

The script element of each of the responders 511 includes an identifier of the responder 511 (for example, line 5 in the script 131a in FIG. 6) and a list of an identifier(s) of an initiator(s) 501 from which the responder 511 waits to receive a message(s) (a transmission source initiator list) (line 6). In an initialization process of the responder 511, the responder 511 waits to receive a message(s) from an initiator(s) 501 included in the transmission source initiator list.

For example, in the script 131a in FIG. 6, the responder 511 "Xr" waits to receive a message from an initiator 501 "Xi" that is deployed to the virtual machine "VM2".

To a requisite component(s) of a component(s) to be deployed after a responder 511 has been deployed, the responder 511 is added (for example, line 10 in the script 131a in FIG. 6).

For example, the script 131a in FIG. 6 has the responder 511 "Xr" added to the requisite component of the component "B".

The script element of each of the initiators 501 includes the identifier of the initiator 501 (for example, line 13 in the script 131a in FIG. 6) and an identifier(s) of a requisite component(s) (line 14). Further, the script element of each of the initiator 501 includes a list of the identifier(s) of a responder(s) 511 to which the initiator 501 transmits a message(s) (a destination responder list) (line 15). In an initialization process of the initiator 501, the initiator 501 transmits a message(s) to the responder(s) 511 included in the destination responder list and waits to receive a reception confirmation(s) of the message(s).

For example, in the script 131a in FIG. 6, the component "B" is set as requisite components of the initiators 501 "Yi" and "Zi". To the destination responder list of the initiator 501 "Yi", a responder 511 "Yr", which is deployed to the virtual machine "VM3", is set. To the destination responder list of the initiator 501 "Zi", a responder 511 "Zr", which is deployed to the virtual machine "VM4", is set.

Figure 7:
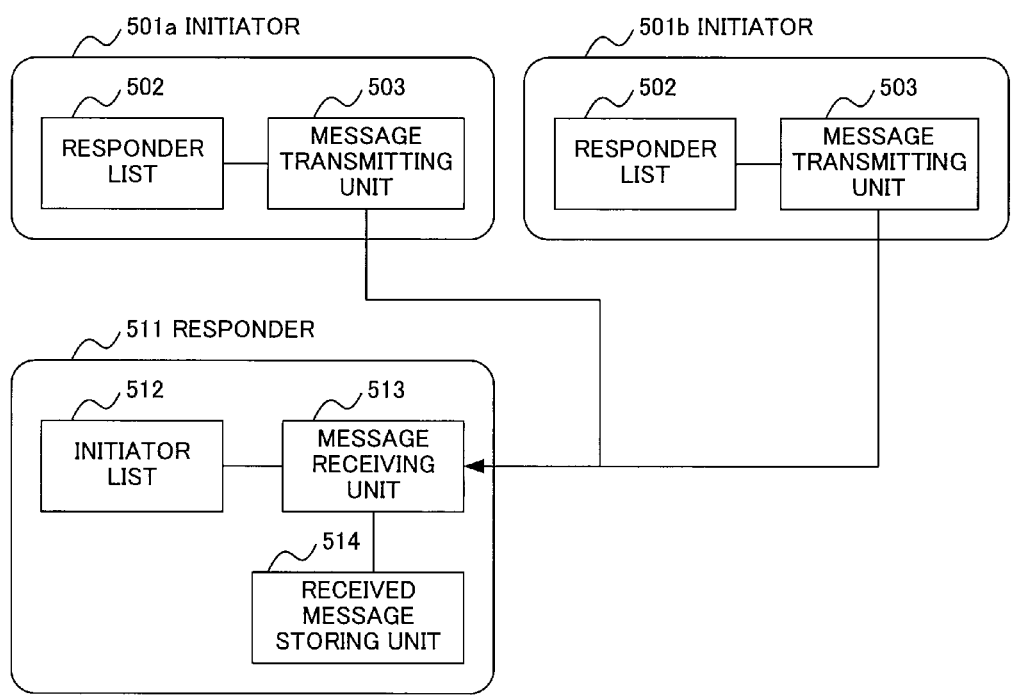
FIG. 7 is a diagram illustrating a configuration of synchronization modules in the first exemplary embodiment of the present invention.

FIG. 7 is a diagram illustrating a configuration of synchronization modules in the first exemplary embodiment of the present invention. In the example in FIG. 7, two initiators 501 (501a and 501b) and a responder 511 are illustrated as synchronization modules.

Each of the initiators 501 includes a responder list 502 and a message transmitting unit 503. The responder list 502 is a list of the identifier(s) of a responder(s) 511 to which the initiator 501 transmits a message(s). To the responder list 502, an entry(ies) of a destination responder list in a script element is/are set in accordance with an argument(s) or the like in activating an initialization process of the initiator 501.

The message transmitting unit 503 transmits a message(s) to the responder(s) 511 included in the responder list 502.

The responder 511 includes an initiator list 512, a message receiving unit 513, and a received message storing unit 514. The initiator list 512 is a list of the identifier(s) of an initiator(s) 501 from which the responder 511 waits to receive a message(s). To the initiator list 512, an entry(ies) of a transmission source initiator list in a script element is/are set in accordance with an argument(s) or the like in activating an initialization process of the responder 511. The message receiving unit 513 receives a message(s) from the initiator(s) 501. The received message storing unit 514 stores the received message(s).

The script distributing unit 140 distributes the scripts 131, which are generated by the script generating unit 130, to the respective processing devices 200.

The script repository 150 stores the script elements, which describe deployment processes of the respective components.

The deployment device 100 may be a computer that includes a CPU (Central Processing Unit) and a storage medium storing a program and operates controlled on the basis of the program. The logical configuration storing unit 110, the physical configuration storing unit 120, and the script repository 150 may be configured with either individual storage media or a single storage medium.

The logical configuration information 111, the physical configuration information 121, and the scripts 131 may be scripted in a format other than the XML.

Next, an operation of the first exemplary embodiment of the present invention will be described.

First, a generation process of scripts 131 and an insertion process of script elements of synchronization modules in the first exemplary embodiment of the present invention will be described.

Figure 8:
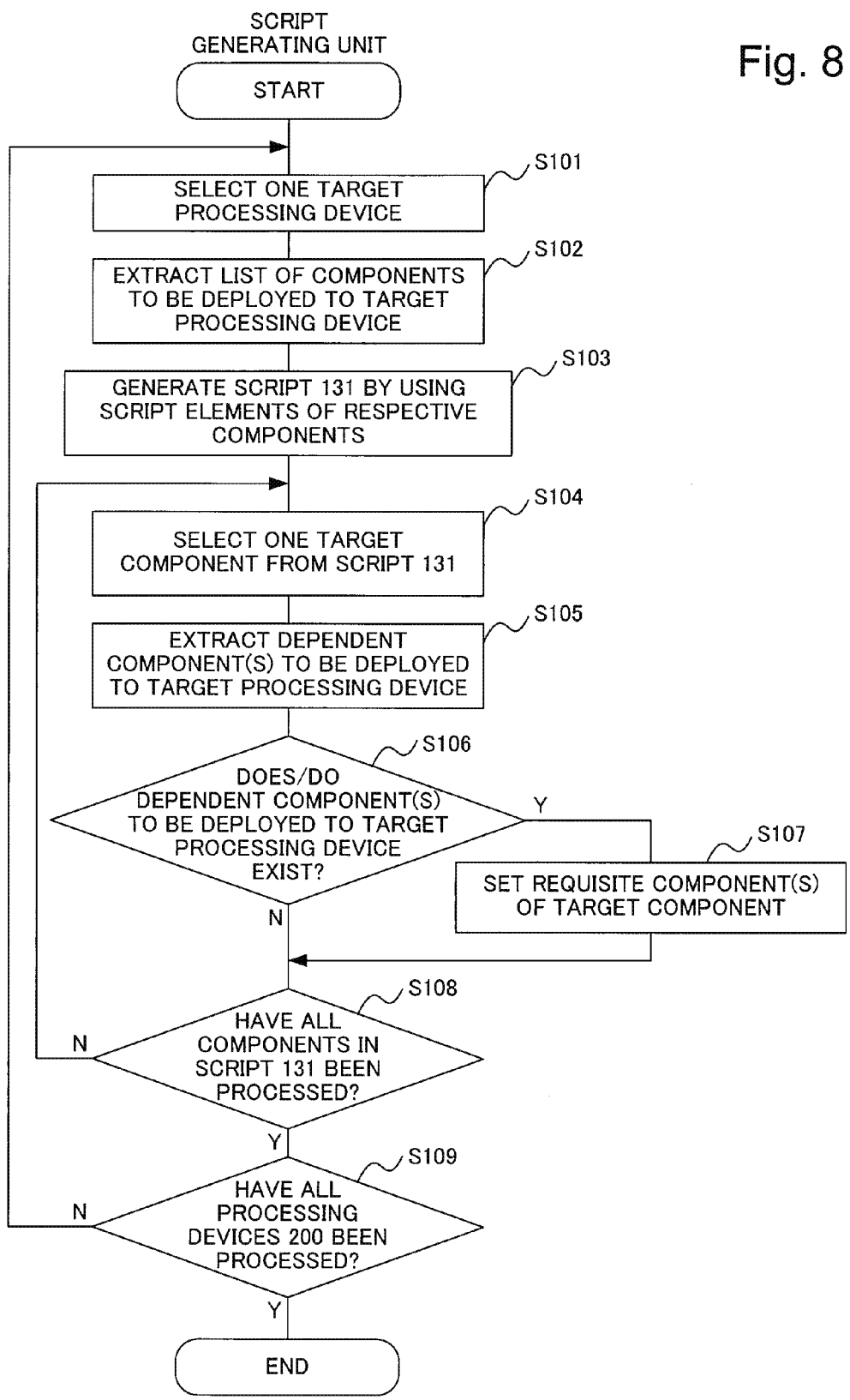
FIG. 8 is a flowchart illustrating a generation process of the scripts 131 in the first exemplary embodiment of the present invention.
Figure 9:
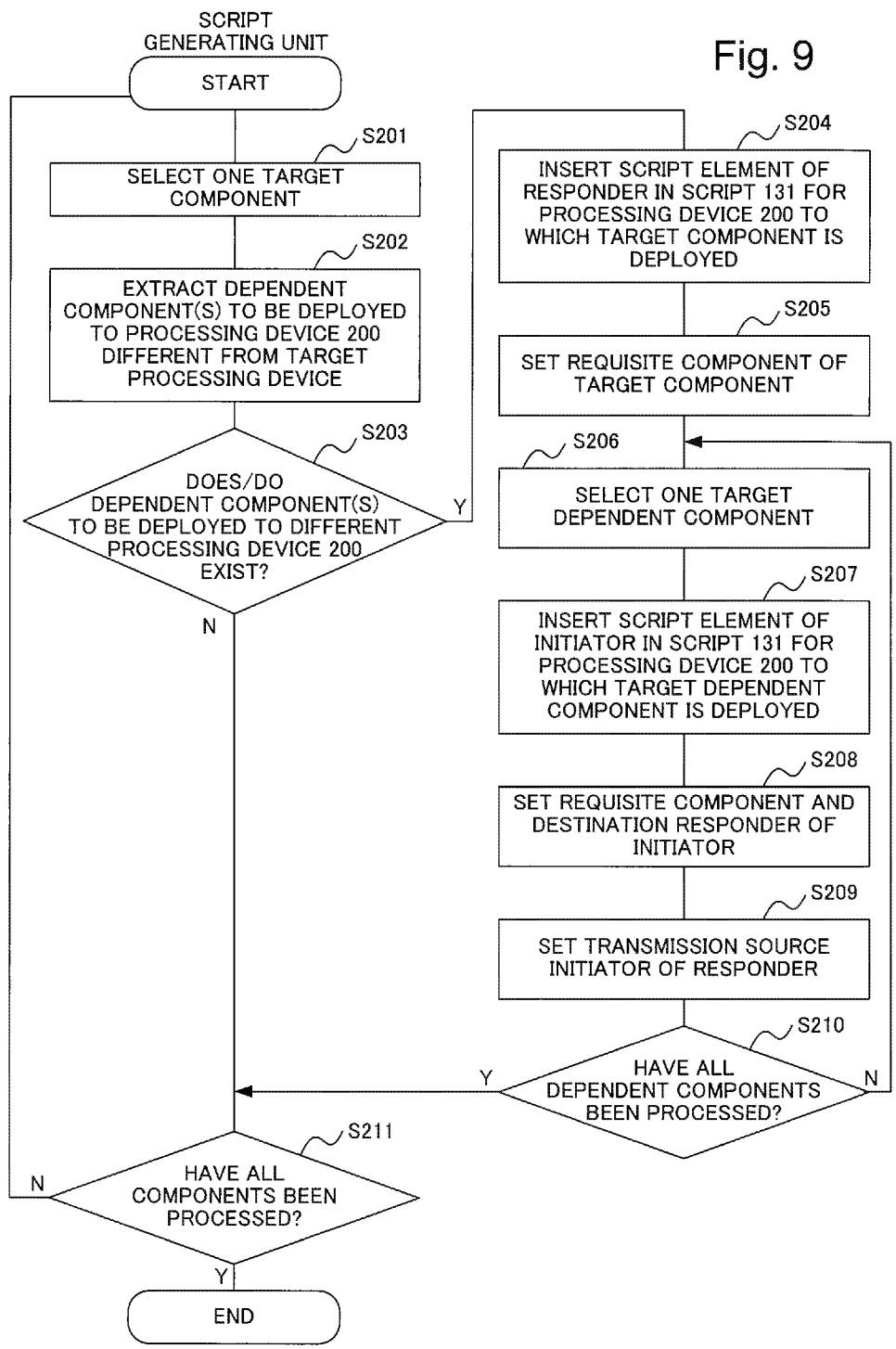
FIG. 9 is a flowchart illustrating an insertion process of script elements of synchronization modules in the first exemplary embodiment of the present invention.

FIG. 8 is a flowchart illustrating the generation process of scripts 131 in the first exemplary embodiment of the present invention. FIG. 9 is a flowchart illustrating the insertion process of script elements of synchronization modules in the first exemplary embodiment of the present invention.

The script generating unit 130 generates scripts 131 through the generation process of scripts 131 (FIG. 8). The script generating unit 130 inserts script elements of synchronization modules in the generated scripts 131 through the insertion process of script elements of synchronization modules (FIG. 9).

In the following description, it is assumed that the logical configuration information 111 in FIG. 4 and the physical configuration information 121 in FIG. 5 are stored in the logical configuration storing unit 110 and the physical configuration storing unit 120, respectively.

The script generating unit 130, on the basis of the physical configuration information 121, selects a processing device 200 to which a component(s) composing the system is/are deployed (a target processing device) (step S101). The script generating unit 130, referring to the physical configuration information 121, extracts a list of a component(s) to be deployed to the target processing device (step S102). The script generating unit 130, by acquiring a script element(s) to deploy the respective extracted component(s) from the script repository 150 and arranging the acquired script element(s), generates a script 131 to be executed on the target processing device (step S103).

For example, on the basis of the physical configuration information 121 in FIG. 4, the script generating unit 130 arranges script elements to deploy the components "A1" and "B" with respect to the virtual machine "VM1", as in the script 131a in FIG. 5.

The script generating unit 130 selects a component (a target component) in the script 131 (step S104). The script generating unit 130 refers to the logical configuration information 111. The script generating unit 130 extracts, among components on which the target component is dependent (dependent components), a list of a dependent component(s) that is/are deployed to the same processing device 200 as the target component (the target processing device) (step S105). When a dependent component(s) that is/are deployed to the target processing device exist(s) (Y in step S106), the script generating unit 130 sets the dependent component(s) as a requisite component(s) of the target component (step S107).

For example, on the basis of the logical configuration information 111 in FIG. 3, the script generating unit 130 sets, among the dependent components of the component "B", the component "A1", which is deployed to the virtual machine "VM1", as a requisite component of the component "B" as illustrated in FIG. 5.

The script generating unit 130, with respect to all components in the script 131, repeats the processing in steps S104 to S107 (step S108).

The script generating unit 130, with respect to all processing devices 200 to which the components composing the system are deployed, repeats the processing in steps S101 to S108 (step S109).

As a consequence, the scripts 131a to 131d in FIG. 5 are generated for the virtual machines "VM1" to "VM4", respectively.

Next, the script generating unit 130, on the basis of the logical configuration information 111, selects a component (a target component) composing the system (step S201). The script generating unit 130, referring to the logical configuration information 111, extracts a list of a dependent component(s) that is/are deployed to a processing device(s) 200 other than the processing device 200 to which the target component is deployed, from a dependent component(s) of the target component (step S202). When a dependent component(s) that is/are deployed to another/other processing device(s) 200 exist(s) (Y in step S203), the script generating unit 130 carries out the following processing. The script generating unit 130 inserts a script element(s) to deploy a responder(s) 511 in the script 131 for the processing device 200 to which the target component is deployed (step S204). The script generating unit 130 adds the identifier(s) of the responder(s) 511 that has/have been inserted in step S204 to the requisite component(s) of the target component (step S205).

For example, the script generating unit 130, on the basis of the logical configuration information 111 in FIG. 3, decides that the dependent components of the component "B" include the component "A2" that is deployed to the virtual machine "VM2", which is different from the virtual machine "VM1". The script generating unit 130, as in FIG. 6, inserts the script element of the responder 511 "Xr" in the script 131a for the virtual machine "VM1", and adds the responder 511 "Xr" to the requisite component of the component "B".

Next, the script generating unit 130 select a dependent component (a target dependent component) from the list of the dependent component(s), which is/are extracted in step S202, to be deployed to another/other processing device(s) 200 (step S206). The script generating unit 130 inserts a script element to deploy an initiator 501 in the script 131 for the processing device 200 to which the target dependent component is deployed (step S207). The script generating unit 130 sets the identifier of the target dependent component as a requisite component of the initiator 501 and the identifier of the responder 511, which has been inserted in step S204, to a destination responder list thereof (step S208). The script generating unit 130 sets the identifier of the initiator 501, which has been inserted in step S207, to the transmission source initiator list of the responder 511, which has been inserted in step S204 (step S209).

For example, the script generating unit 130, as in FIG. 6, inserts a script element of the initiator 501 "Xi" in script 131b for the virtual machine "VM2" to which the component "A2" is deployed. The script generating unit 130 individually sets the component "A2" as a requisite component of the initiator 501 "Xi" and the responder 511 "Xr" to a destination responder list thereof. The script generating unit 130, as in FIG. 6, sets the initiator 501 "Xi" to a transmission source initiator list of the responder 511 "Xr".

The script generating unit 130, with respect to all dependent components in the list of a dependent component(s), which has been extracted in step S202, to be deployed to another/other processing device(s) 200, repeats the processing in steps S206 to S209 (step S210).

The script generating unit 130, with respect to all components composing the system, repeats the processing in steps S201 to S210 (step S211).

As a consequence, as in FIG. 6, the script elements of the synchronization modules are inserted in the scripts 131a to 131d for the virtual machines "VM1" to "VM4".

The scripts 131 in which the script elements of the synchronization modules are inserted are distributed to the respective processing devices 200 by the script distributing unit 140. The agents 210 in the respective processing devices 200 execute the distributed scripts 131 and deploy the components and the synchronization modules (the initiator(s) 501 and the responder(s) 511).

Next, initialization processes of the initiator(s) 501 and the responder(s) 511 in the first exemplary embodiment of the present invention will be described.

Figure 10:
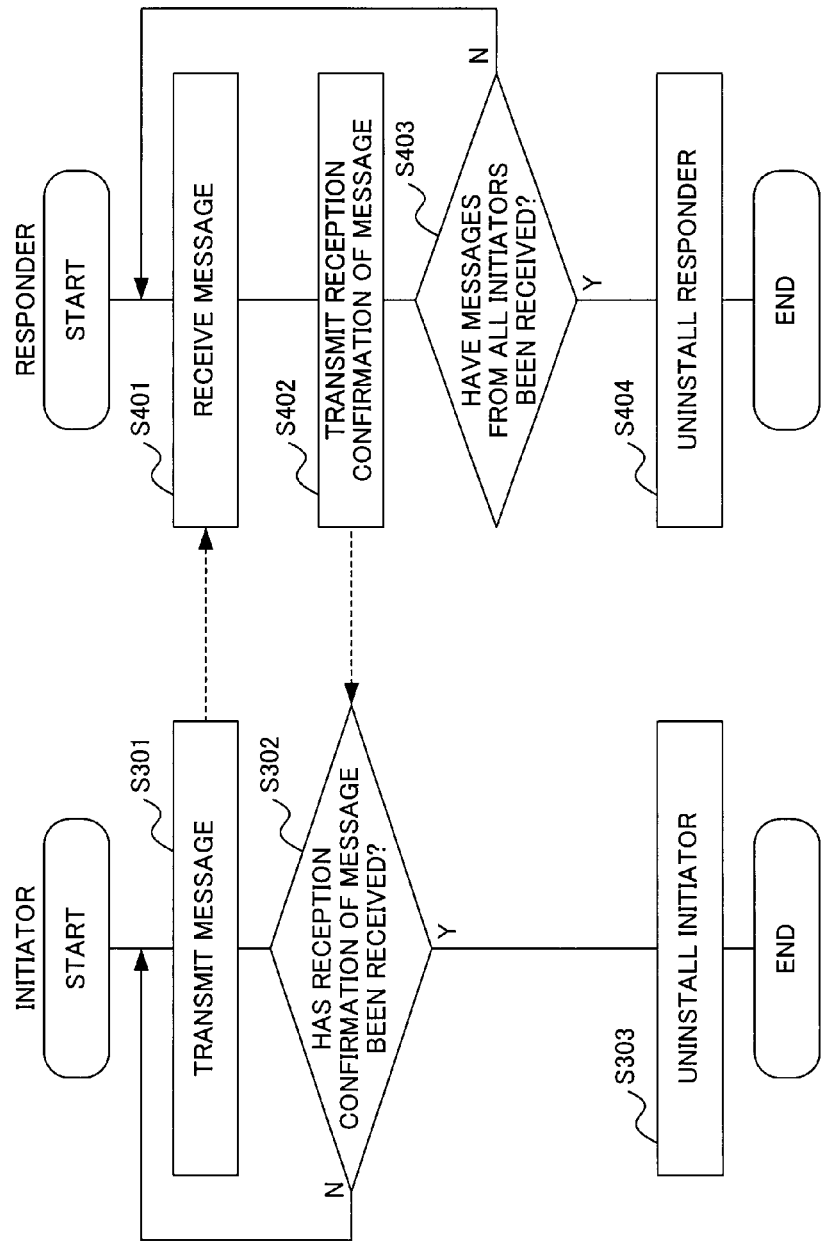
FIG. 10 is a flowchart illustrating initialization processes of an initiator(s) 501 and a responder(s) 511 in the first exemplary embodiment of the present invention.

FIG. 10 is a flowchart illustrating the initialization processes of the initiator 501 and the responder 511 in the first exemplary embodiment of the present invention.

An agent 210, after installing the initiator 501 in accordance with a script 131, activates the initialization process of the initiator 501 (FIG. 10). The execution of the script 131 is blocked until the initialization process of the initiator 501 is completed.

The initiator 501 transmits a message for synchronization to the responder 511, which is included in the responder list 502 thereof (step S301). The initiator 501 repeats the processing in step S301 until the initiator 501 receives a reception confirmation of the message from the responder 511 (step S302). When the initiator 501 receives a reception confirmation of the message from the responder 511 (Y in step S302), the initiator 501 carries out deployment removal (uninstallation) of the initiator 501 itself (step S303).

An agent 210, after installing the responder 511 in accordance with a script 131, activates the initialization process of the responder 511 (FIG. 10). The execution of the script 131 is blocked until the initialization process of the responder 511 is completed.

When the responder 511 receives a message from the initiator 501 (step S401), the responder 511 transmits a reception confirmation of the message to the initiator 501, which is the transmission source of the message (step S402). The responder 511 repeats the processing in steps S401 and S402 until the responder 511 receives messages from all initiators 501 included in the initiator list 512 (step S403). When the responder 511 receives messages from all initiators 501 (Y in step S403), the responder 511 carries out deployment removal (uninstallation) of the responder 511 itself (step S404).

Since the initiator 501 and the responder 511 are not required in the operations of the system, the initiator 501 and the responder 511 may be uninstalled when the initialization processes are completed, as described above.

Next, a specific example of deployment of a system will be described. In this example, it is assumed that, on the basis of the logical configuration information 111 in FIG. 4 and the physical configuration information 121 in FIG. 5, the scripts 131a to 131d in FIG. 6 have been generated and distributed to the virtual machines "VM1" to "VM4", respectively.

The agent 210 of the virtual machine "VM2", in accordance with the script 131b in FIG. 6, deploys the component "A2" and the initiator 501 "Xi" in order. In the initialization process of the initiator 501 "Xi", the initiator 501 "Xi" transmits a message to the responder 511 "Xr".

The agent 210 of the virtual machine "VM1", in accordance with the script 131a in FIG. 6, deploys the component "A1" and the responder 511 "Xr". In the initialization process of the responder 511 "Xr", the responder 511 "Xr" waits to receive a message from the initiator 501 "Xi". Until a message from the initiator 501 "Xi" is received, the deployment process (the initialization process) of the responder 511 "Xr" is blocked.

When the deployment of the component "A1" and the responder 511 "Xr" is completed, the agent 210 of the virtual machine "VM1" deploys the component "B". When the deployment of the component "B" is completed, the agent 210 of the virtual machine "VM1" deploys the initiators 501 "Yi" and "Zi".

The agent 210 of the virtual machine "VM3", in accordance with the script 131c in FIG. 6, deploys the responder 511 "Yr". In the initialization process of the responder 511 "Yr", the responder 511 "Yr" waits to receive a message from the initiator 501 "Yi". Until a message from the initiator 501 "Yi" is received, the deployment process (the initialization process) of the responder 511 "Yr" is blocked. When the deployment of the responder 511 "Yr" is completed, the agent 210 of the virtual machine "VM3" deploys the component "C1".

The agent 210 of the virtual machine "VM4", in accordance with the script 131d in FIG. 6, deploys the responder 511 "Zr". In the initialization process of the responder 511 "Zr", the responder 511 "Zr" waits to receive a message from the initiator 501 "Zi". Until a message from the initiator 501 "Zi" is received, the deployment process (the initialization process) of the responder 511 "Zr" is blocked. When the deployment of the responder 511 "Zr" is completed, the agent 210 of the virtual machine "VM4" deploys the component "C2".

The initiators 501 "Xi", "Yi", and "Zi" and the responders 511 "Xr", "Yr", and "Zr" are uninstalled when the deployment thereof is completed.

As described above, control of the deployment sequences among the components in accordance with the logical configuration information 111 in FIG. 4 is carried out among the different processing devices 200.

With the processing described hereinbefore, the operation of the first exemplary embodiment of the present invention is completed.

Figure 1:
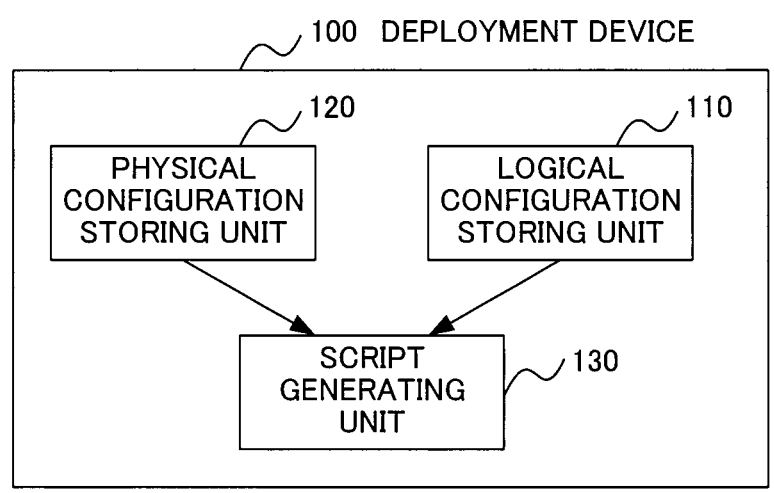
FIG. 1 is a block diagram illustrating a characteristic configuration of a first exemplary embodiment of the present invention.

Next, a characteristic configuration of the first exemplary embodiment of the present invention will be described. FIG. 1 is a block diagram illustrating the characteristic configuration of the first exemplary embodiment of the present invention.

With reference to FIG. 1, the deployment device 100 includes the logical configuration storing unit 110, the physical configuration storing unit 120, and the script generating unit 130.

The logical configuration storing unit 110 stores the logical configuration information 111 that indicates dependencies among a plurality of software components composing a system.

The physical configuration storing unit 120 stores the physical configuration information 121 that indicates, among a plurality of processing devices 200, the processing devices 200 to which each of a plurality of software components composing the system is deployed.

On the basis of the logical configuration information 111 and the physical configuration information 121, the script generating unit 130, with respect to each of the plurality of processing devices 200, generates a script 131 that is executed in the processing device 200. In the script 131, a process(es) to deploy a respective software component(s) that is/are deployed to the processing device 200 and a process(es) to deploy a synchronization module(s) are described together with an execution sequence(s). Each synchronization module synchronizes processing of the script 131 with a synchronization module that is deployed to another processing device 200.

With the first exemplary embodiment of the present invention, it is possible to carry out decentralized deployment of components even for construction of a decentralized system that has dependencies among the components in different processing devices. That is because the script generating unit 130 generates scripts 131 as described below. In the scripts 131, processes to deploy respective components that are deployed to the processing devices 200 and processes to deploy synchronization modules are described together with execution sequences. Each synchronization module synchronizes processing of the script 131 with a synchronization module that is deployed to another processing device 200.

With this configuration, in the construction of a decentralized system that has dependencies among components in different processing devices, no central management type deployment server is required, and control communications do not concentrate on a deployment server. Thus, it is possible to construct even a large scale decentralized system in a short period of time.

With the first exemplary embodiment of the present invention, it is also possible to control deployment sequences among components in different processing devices with no special means included in the processing devices. That is because deploying synchronization modules to the processing devices 200 in accordance with scripts 131 makes it possible to synchronize processing of the script 131 with a synchronization module that is deployed to another processing device 200.

With the first exemplary embodiment of the present invention, it is also possible to control deployment sequences among components in different processing devices without specifying, for a processing device, another processing device with which the processing device is synchronized with respect to each component. That is because the script generating unit 130, on the basis of the logical configuration information 111 and the physical configuration information 121, inserts processes to deploy synchronization modules in a combination of scripts 131 to be synchronized.

Second Exemplary Embodiment

Next, a second exemplary embodiment of the present invention will be described.

In the first exemplary embodiment of the present invention, when a plurality of components are dependent on the same component as the component "B" and the components "C1" and "C2" in FIG. 6, script elements of a plurality of different initiators 501 ("Yi" and "Zi") are inserted. Thus, the greater the number of components that are dependent on the same component becomes, the greater the number of deployment processes of initiators 501 increases and the longer the time required for construction of a system lengthens.

In the second exemplary embodiment of the present invention, when a plurality of components are dependent on the same component, a common initiator 501 is used.

Next, the second exemplary embodiment of the present invention will be described.

First, a configuration of the second exemplary embodiment of the present invention will be described.

A configuration of a deployment system and a configuration of synchronization modules of the second exemplary embodiment of the present invention are the same as the first exemplary embodiment (FIGS. 2 and 7) of the present invention.

Figure 11:
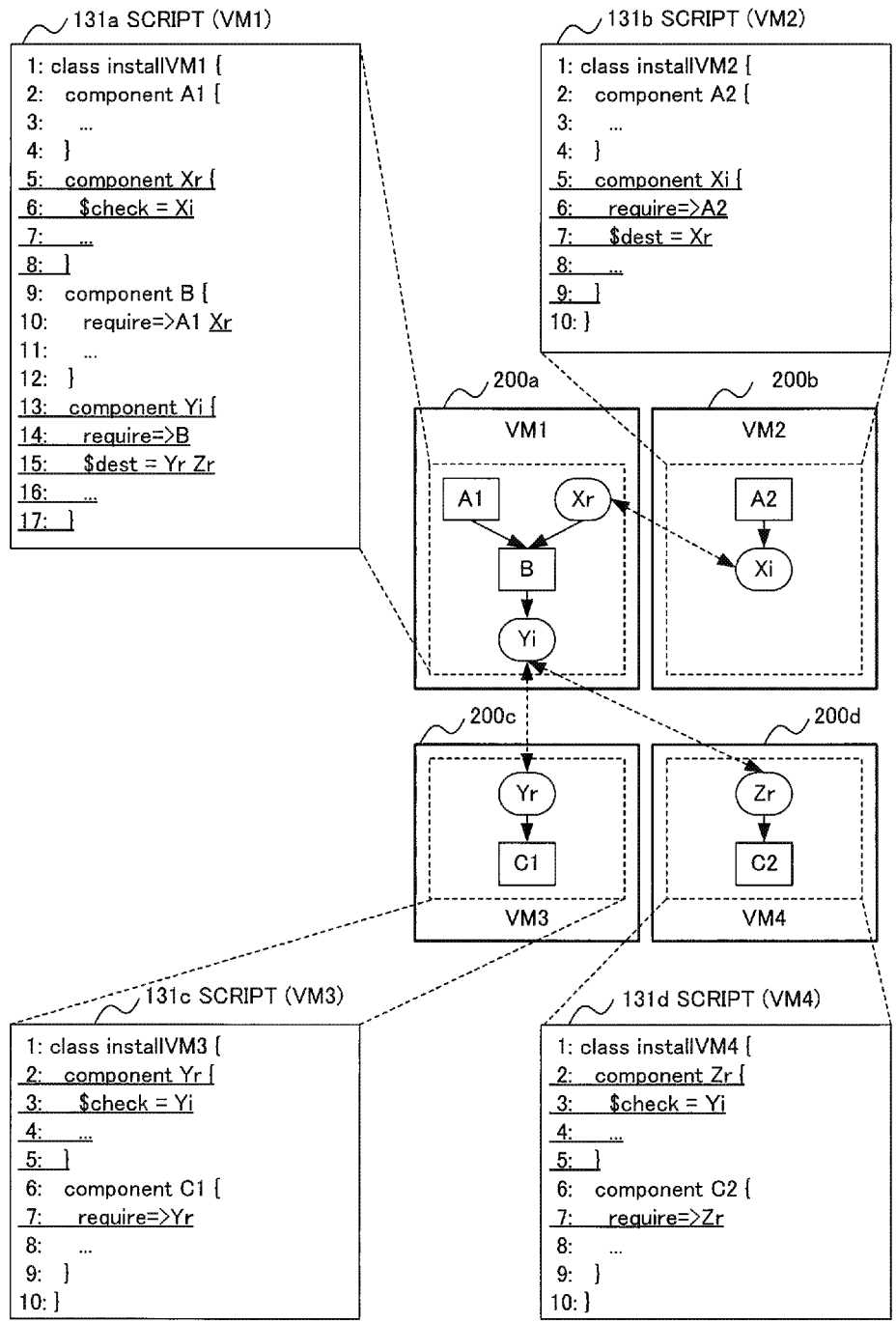
FIG. 11 is a diagram illustrating an example of scripts 131 (after insertion of synchronization modules) in a second exemplary embodiment of the present invention.

FIG. 11 is a diagram illustrating an example of scripts 131 (131a to 131d) (after insertion of synchronization modules) in the second exemplary embodiment of the present invention.

The script 131a for a virtual machine "VM1" in FIG. 11 has a script element (lines 13 to 17) to deploy an initiator 501 "Yi" inserted in the script 131a in FIG. 5. To a destination responder list of the initiator 501 "Yi", a responder 511 "Yr", which is deployed to a virtual machine "VM3", and a responder 511 "Zr", which is deployed to a virtual machine "VM4", are set.

Next, an operation of the second exemplary embodiment of the present invention will be described.

A generation process of the scripts 131 in the second exemplary embodiment of the present invention is the same as the generation process of the scripts 131 in the first exemplary embodiment (FIG. 8) of the present invention.

An insertion process of script elements of synchronization modules in the second exemplary embodiment of the present invention is different from the insertion process in the first exemplary embodiment (FIG. 9) of the present invention in the following points.

In step S207 in FIG. 9, a script generating unit 130 does not insert a script element of another initiator 501 in the following case. That is, when, in a script 131 for a processing device 200 to which a target dependent component is deployed, a script element of an initiator 501 that has the target dependent component set as a requisite component already exists, the script generating unit 130 does not carry out insertion.

In step S208, the script generating unit 130 adds an identifier of a responder 511 to a destination responder list in the already-existing script element of the initiator 501.

In step S209, the script generating unit 130 adds an identifier of the already-existing initiator 501 to a transmission source initiator list of the responder 511.

For example, with respect to a component "B" and components "C1" and "C2", the script generating unit 130 carries out the following process. First, the script generating unit 130, as in FIG. 11, inserts a script element of the responder 511 "Yr" in the script 131c for the virtual machine "VM3", to which the component "C1" is deployed. The script generating unit 130 inserts a script element of the initiator 501 "Yi" in the script 131a for the virtual machine "VM1", to which the component "B" is deployed. The script generating unit 130 sets the component "B" as a requisite component of the initiator 501 "Yi" and the responder 511 "Yr" to a destination responder list thereof.

Next, the script generating unit 130 inserts a script element of the responder 511 "Zr" in the script 131d for the virtual machine "VM3", to which the component "C2" is deployed. In this case, in the script 131a for the virtual machine "VM1", the script element of the initiator 501 "Yi" the requisite component of which is the component "B" already exists. Thus, the script generating unit 130 adds the responder 511 "Zr" to the destination responder list of the initiator 501 "Yi". The script generating unit 130 sets the initiator 501 "Yi" to a transmission source initiator list of the responder 511 "Zr".

As a consequence, in the scripts 131a to 131d for the virtual machines "VM1" to "VM4", the script elements of the synchronization modules are inserted as in FIG. 11.

Next, initialization processes of the initiator(s) 501 and the responder(s) 511 in the second exemplary embodiment of the present invention will be described.

The initialization processes of the initiator(s) 501 and the responder(s) 511 in the second exemplary embodiment of the present invention differ from the initialization processes in the first exemplary embodiment (FIG. 10) of the present invention in the following points.

In step S301 in FIG. 10, the initiator 501 transmits messages for synchronization to, among the responders 511 included in the responder list 502, all responders 511 from which no reception confirmation of the message is received.

In step S302, the initiator 501 repeats the processing in step S301 until the initiator 501 receives reception confirmations of the messages from all responders 511 included in the responder list 502.

With the processing described hereinbefore, the operation of the second exemplary embodiment of the present invention is completed.

With the second exemplary embodiment of the present invention, it is possible to construct a system in a shorter period of time compared with the first exemplary embodiment of the present invention. That is because, when a plurality of components are dependent on the same component, by using a common initiator 501, it is possible to reduce the deployment processes of initiators 501 and shorten the time required to construct a system.

Third Exemplary Embodiment

Next, a third exemplary embodiment of the present invention will be described.

In the first exemplary embodiment of the present invention, by the initiator(s) 501 transmitting and receiving messages directly to/from the responder(s) 511, deployment sequences among the processing devices 200 are controlled. In this case, while decentralization of control is achieved, there is a possibility that useless communications take place since the initiator(s) 501 continue(s) retransmitting notifications until the responder(s) 511 reach(es) a notification receivable state(s).

In the third exemplary embodiment of the present invention, transmission and reception of messages between an initiator(s) 601 and a responder(s) 611 are carried out via a message queue 621.

First, a configuration of the third exemplary embodiment of the present invention will be described.

A configuration of a deployment system of the third exemplary embodiment of the present invention is the same as the first exemplary embodiment (FIG. 2) of the present invention.

Figure 12:
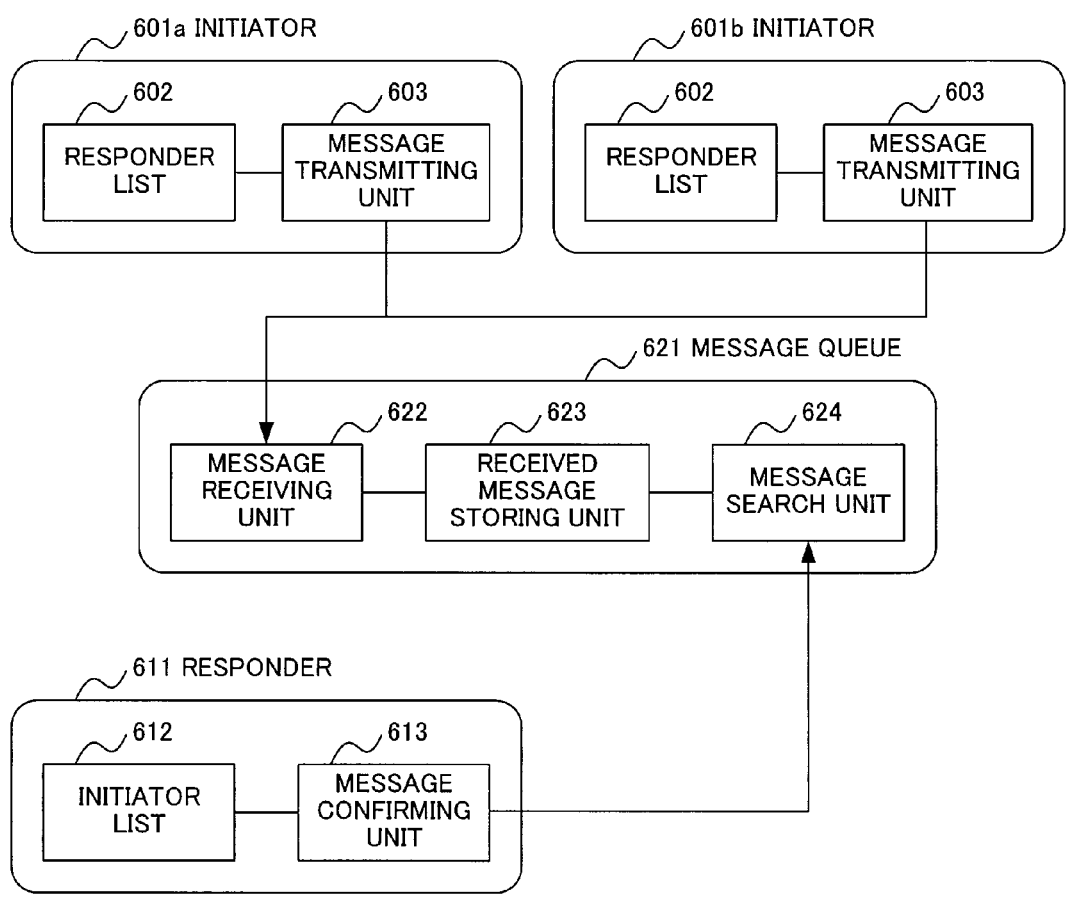
FIG. 12 is a diagram illustrating a configuration of synchronization modules in a third exemplary embodiment of the present invention.

FIG. 12 is a diagram illustrating a configuration of synchronization modules in the third exemplary embodiment of the present invention. In the third exemplary embodiment of the present invention, the initiators 501 and the responder 511 in the first exemplary embodiment of the present invention are replaced with initiators 601 (601a and 601b) and a responder 611.

Each initiator 601 includes a responder list 602 and a message transmitting unit 603. The responder list 602 is the same as the responder list 502. The message transmitting unit 603 transmits a message destined for the responder 611, which is included in the responder list 602, to the message queue 621.

The responder 611 includes an initiator list 612 and a message confirming unit 613. The initiator list 612 is the same as the initiator list 512. The message confirming unit 613 confirms reception of a message for the responder 611 from one of the initiators 601 with the message queue 621.

The message queue 621 is, for example, arranged in any one of processing devices 200. The message queue 621 includes a message receiving unit 622, a received message storing unit 623, and a message search unit 624. The message receiving unit 622 receives messages from the initiators 601. The received message storing unit 623 stores the received messages. The message search unit 624 searches for a message(s) from the initiator(s) 601 in response to a demand(s) from the responder 611.

Next, an operation of the third exemplary embodiment of the present invention will be described.

A generation process of scripts 131 and an insertion process of script elements of synchronization modules in the third exemplary embodiment of the present invention are the same as the first exemplary embodiment (FIGS. 8 and 9) of the present invention.

Next, initialization processes of the initiators 601 and the responder 611 in the third exemplary embodiment of the present invention will be described.

Figure 13:
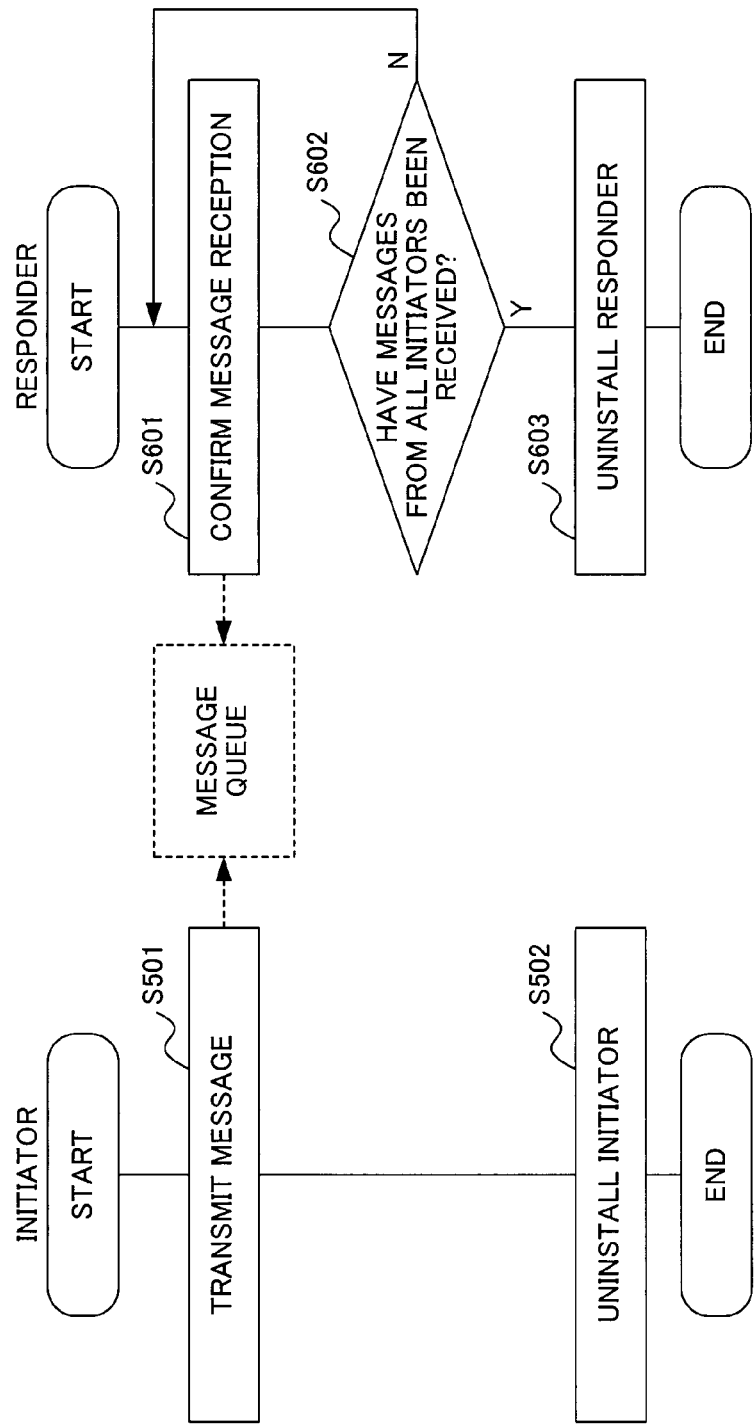
FIG. 13 is a flowchart illustrating initialization processes of an initiator(s) 601 and a responder(s) 611 in the third exemplary embodiment of the present invention.

FIG. 13 is a flowchart illustrating the initialization processes of the initiators 601 and the responder 611 in the third exemplary embodiment of the present invention.

The initiators 601 transmits messages for the responder 611, which is included in the responder lists 602, to the message queue 621 (step S501). The initiators 601 carry out deployment removal (uninstallation) of the initiators 601 themselves (step S502).

When the message receiving unit 622 of the message queue 621 receives messages from the initiators 601, the message queue 621 stores the received messages in the received message storing unit 623.

The message confirming unit 613 of the responder 611 inquires the message queue 621 of whether or not a message for the responder 611 is received from one of the initiators 601, which are included in the initiator list 612 (step S601). The message search unit 624, in response to a demand from the responder 611, searches for a message for the responder 611 from one of the initiators 601 and returns a result of the search to the responder 611. The responder 611 repeats the processing in step S601 until the reception of messages from all initiators 601 included in the initiator list 612 is confirmed (step S602). When the reception of messages from all initiators 601 is confirmed (Y in step S602), the responder 611 carries out deployment removal (uninstallation) of the responder 611 itself (step S603).

With the third exemplary embodiment of the present invention, compared with the first exemplary embodiment of the present invention, it is possible to reduce useless communications between the initiator(s) 501 and the responder(s) 511. That is because transmission and reception of messages between the initiator(s) 601 and the responder(s) 611 are carried out via the message queue 621.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2013-083085, filed on Apr. 11, 2013, the disclosure of which is incorporated herein in its entirety by reference.

REFERENCE SIGNS LIST

100 Deployment device
110 Logical configuration storing unit
111 Logical configuration information
120 Physical configuration storing unit
121 Physical configuration information
130 Script generating unit
131 Script
140 Script distributing unit
150 Script repository
200 Processing device
210 Agent
300 Component repository
501 Initiator
502 Responder list
503 Message transmitting unit
511 Responder
512 Initiator list
513 Message receiving unit
514 Received message storing unit
601 Initiator
602 Responder list
603 Message transmitting unit
611 Responder
612 Initiator list
613 Message confirming unit
621 Message queue
622 Message receiving unit
623 Received message storing unit
624 Message search unit

What is claimed is:

1. An information processing device comprising:
a logical configuration information storing unit which stores logical configuration information that indicates dependencies among a plurality of software components of a system;
a physical configuration information storing unit which stores physical configuration information that indicates a processing device among a plurality of processing devices, to which each of the plurality of software components of the system is to be deployed; and a script generating unit which generates a script for each of the plurality of processing devices on the basis of the logical configuration information and the physical configuration information, the script being to be executed on the processing device, the script indicating a process for deploying each software component to be deployed to the processing device and a process for deploying a synchronization module to synchronize processing of the script with a synchronization module deployed to another processing device together with an execution sequence.

2. The information processing device according to claim 1, wherein,
as the synchronization modules, an initiator that transmits a message to a responder at the time of deployment and the responder that waits to receive the message from the initiator at the time of deployment are used, and
the script generating unit, when a first software component deployed to a first processing device is dependent on a second software component deployed to a second processing device, inserts a process to deploy the responder before a process to deploy the first software component in the script for the first processing device, and inserts a process to deploy the initiator after a process to deploy the second software component in the script for the second processing device.

3. The information processing device according to claim 1, wherein,
the synchronization module removes deployment of the synchronization module at the time of deployment completion.

4. The information processing device according to claim 1, further comprising:
a script distribution unit which distributes, to each of the plurality of processing devices, a script that is generated for the processing device.

5. A deployment method comprising:
storing logical configuration information that indicates dependencies among a plurality of software components of a system;
storing physical configuration information that indicates a processing device among a plurality of processing devices, to which each of the plurality of software components of the system is to be deployed; and
generating a script for each of the plurality of processing devices on the basis of the logical configuration information and the physical configuration information, the script being to be executed on the processing device, the script indicating a process for deploying each software component to be deployed to the processing device and a process for deploying a synchronization module to synchronize processing of the script with a synchronization module deployed to another processing device together with an execution sequence.

6. The deployment method according to claim 5, wherein,
as the synchronization modules, an initiator that transmits a message to a responder at the time of deployment and the responder that waits to receive the message from the initiator at the time of deployment are used, and
in generating the script, when a first software component deployed to a first processing device is dependent on a second software component deployed to a second processing device, inserting a process to deploy the responder before a process to deploy the first software component in the script for the first processing device, and inserting a process to deploy the initiator after a process to deploy the second software component in the script for the second processing device.

7. A non-transitory computer readable storage medium recording thereon a program, causing a computer to perform a method comprising:
storing logical configuration information that indicates dependencies among a plurality of software components of a system;
storing physical configuration information that indicates a processing device among a plurality of processing devices, to which each of the plurality of software components of the system is to be deployed; and
generating a script for each of the plurality of processing devices on the basis of the logical configuration information and the physical configuration information, the script being to be executed on the processing device, the script indicating a process for deploying each software component to be deployed to the processing device and a process for deploying a synchronization module to synchronize processing of the script with a synchronization module deployed to another processing device together with an execution sequence.

8. The non-transitory computer readable storage medium recording thereon the program according to claim 7, causing a computer to perform the method, wherein,
as the synchronization modules, an initiator that transmits a message to a responder at the time of deployment and the responder that waits to receive the message from the initiator at the time of deployment are used, and
in generating the script, when a first software component deployed to a first processing device is dependent on a second software component deployed to a second processing device, inserting a process to deploy the responder before a process to deploy the first software component in the script for the first processing device, and inserting a process to deploy the initiator after a process to deploy the second software component in the script for the second processing device.

9. A non-transitory computer readable storage medium recording thereon a program, causing a computer to execute:
a process for deploying each software component to be deployed to the computer, among a plurality of software components of a system; and
a process for deploying a synchronization module to synchronize processing of the program with a synchronization module deployed to another processing device,
wherein the process for deploying each software component and the process for deploying the synchronization module are executed in a sequence determined on the basis of dependencies among the plurality of software components.

10. The non-transitory computer readable storage medium recording thereon the program according to claim 9, wherein,
as the synchronization modules, an initiator that transmits a message to a responder at the time of deployment and the responder that waits to receive the message from the initiator at the time of deployment are used, and
the program causes the computer to execute,
when a first software component deployed to the computer is dependent on a second software component deployed to another computer, a process for deploying the responder, that waits to receive the message from the initiator deployed after the second software component in the another computer, before a process for deploying the first software component, and when the second software component is dependent on the first software component, a process for deploying the initiator, that transmits the message to the responder deployed before the second software component in the another computer, after a process for deploying the first software component.

11. An information processing device comprising:
a logical configuration information storing means for storing logical configuration information that indicates dependencies among a plurality of software components of a system;
a physical configuration information storing means for storing physical configuration information that indicates a processing device among a plurality of processing devices, to which each of the plurality of software components of the system is to be deployed; and
a script generating means for generating a script for each of the plurality of processing devices on the basis of the logical configuration information and the physical configuration information, the script being to be executed on the processing device, the script indicating a process for deploying each software component to be deployed to the processing device and a process for deploying a synchronization module to synchronize processing of the script with a synchronization module deployed to another processing device together with an execution sequence.

* * * * *